United States Patent
Gupta et al.

(10) Patent No.: US 9,934,071 B2
(45) Date of Patent: Apr. 3, 2018

(54) JOB SCHEDULER FOR DISTRIBUTED SYSTEMS USING PERVASIVE STATE ESTIMATION WITH MODELING OF CAPABILITIES OF COMPUTE NODES

(71) Applicant: Palo Alto Research Center Incorporated, Palo Alto, CA (US)

(72) Inventors: Shekhar Gupta, Mountain View, CA (US); Christian Fritz, Menlo Park, CA (US); Johan de Kleer, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/983,751

(22) Filed: Dec. 30, 2015

(65) Prior Publication Data

US 2017/0192824 A1 Jul. 6, 2017

(51) Int. Cl.
G06F 9/50 (2006.01)
G06F 9/45 (2006.01)
G06F 9/48 (2006.01)

(52) U.S. Cl.
CPC .......... *G06F 9/5044* (2013.01); *G06F 8/4441* (2013.01); *G06F 9/5027* (2013.01); *G06F 9/4881* (2013.01); *G06F 9/5066* (2013.01); *G06F 9/5072* (2013.01)

(58) Field of Classification Search
None
See application file for complete search history.

(56) References Cited

U.S. PATENT DOCUMENTS

| 7,165,252 B1* | 1/2007 | Xu | G06F 9/4887 718/100 |
| 7,821,656 B2* | 10/2010 | Ito | G06F 3/1204 358/1.1 |
| 8,381,212 B2* | 2/2013 | Brelsford | G06F 9/4843 709/201 |
| 9,128,763 B2* | 9/2015 | Sarkar | G06F 9/5066 |
| 2005/0222885 A1* | 10/2005 | Chen | G06F 9/50 703/13 |

(Continued)

FOREIGN PATENT DOCUMENTS

CN 104317658 A * 1/2015

OTHER PUBLICATIONS

Kumar, K. A.; Konishetty, V. K.; Voruganti, K.; and Rao, G. V. P. 2012. Cash: context aware scheduler for hadoop. In Proceedings of the International Conference on Advances in Computing, Communications and Informatics, ICACCI '12, 52-61. New York, NY, USA: ACM.

(Continued)

*Primary Examiner* — Abu Zar Ghaffari
(74) *Attorney, Agent, or Firm* — Fay Sharpe LLP

(57) ABSTRACT

The following relates generally to computer system efficiency improvements. Broadly, systems and methods are disclosed that improve efficiency in a cluster of nodes by efficient processing of tasks among nodes in a cluster of nodes. Initially, tasks may be scheduled on the nodes in the cluster of nodes. Following that, state information may be received, and a determination may be made as to if tasks should be rescheduled.

29 Claims, 7 Drawing Sheets

(56) References Cited

U.S. PATENT DOCUMENTS

| | | | |
|---|---|---|---|
| 2008/0222642 A1* | 9/2008 | Kakarla | G06F 9/5077 718/104 |
| 2009/0177727 A1* | 7/2009 | Radia | G06F 9/5044 709/201 |
| 2010/0174949 A1* | 7/2010 | Athey | G06F 11/0709 714/39 |
| 2010/0287019 A1* | 11/2010 | Guo | G06F 11/3442 709/224 |
| 2012/0005345 A1* | 1/2012 | Doyle | G06F 9/5066 709/226 |
| 2012/0079494 A1* | 3/2012 | Sandstrom | G06F 9/4881 718/104 |
| 2013/0254196 A1* | 9/2013 | Babu | G06F 17/30595 707/736 |
| 2014/0215481 A1* | 7/2014 | Piet | G06F 9/5061 718/104 |
| 2014/0215487 A1* | 7/2014 | Cherkasova | G06F 9/5083 718/106 |
| 2014/0289733 A1 | 9/2014 | Fritz | |
| 2016/0034566 A1* | 2/2016 | Rahut | G06F 11/1425 707/769 |
| 2016/0098292 A1* | 4/2016 | Boutin | G06F 9/505 718/104 |
| 2016/0350146 A1* | 12/2016 | Udupi | G06F 9/45558 |
| 2017/0017521 A1 | 1/2017 | Gupta | |

OTHER PUBLICATIONS

Blagodurov, S.; Zhuravlev, S.; and Fedorova, A. 2010. Contention-aware scheduling on multicore systems. ACM Trans. Comput. Syst. 28(4):8:1-8:45.

Bortnikov, E.; Frank, A; Hillel, E; and Rao, S. 2012. Predicting execution bottlenecks in map-reduce clusters. In Proceedings of the 4th USENIX conference on Hot Topics in Cloud Computing, HotClond' 12, 18-18. Berkelev, CA, USA: USENIX Association.

Hadoop mapreduce next generation: Capacity Scheduler; https://hadoop.apache.org/docs/current/hadoop-yarn/hadoop-yarn-site/CapacityScheduler.html (Dec. 6, 2015).

Cover. T. M., and Thomas, J. A. 1991. Elements of information theory. New York, NY, USA: Wiley-Interscience.

Hadoop mapreduce next generation- fair scheduler; https://hadoop.apache.org/docs/current/hadoop-yarn/hadoop-yarn-site/FairScheduler.html (Dec. 21, 2015).

Fonseca, R; Porter, G.; Katz, R. H.; Shenker, S.; and Stoica, I. 2007. X-trace: A pervasive network tracing frame-work. In in NSDI.

Hood, R; Jin, H.; Mehrotra, P.; Chang., J.; Djomehri, J.; Gavali, S.; Jespersen, D.; Taylor, K.; and Biswas, R. 2010. Performance impact of resource contention in multicore systems. In Parallel Distributed Processing (IPDPS), 2010 IEEE International Symposium on, 1-12.

Kuhn, L; Price, B.; Do, M.; Liu, J.; Zhou, R.; Schmidt, T.; and de Kleer, J. 2010. Pervasive diagnosis. Systems, Man and Cybernetics. Part A: Systems and Humans, IEEE Transactions on 40(5):932-944.

Lee, G.; Chun, B.-G.; and Katz, H. 2011. Heterogeneity-aware resource allocation and scheduling in the cloud. In Proceedings of the 3rd USENIX conference on Hot topics in cloud computing, HotCloud' 11, 4-4. Berkeley, CA, USA: USENIX Association.

Massie, M. L.; Chun, B. N.; and Culler, D. E 2004. The Ganglia Distributed Monitoring System: Design, Implementation, and Experience. Parallel Computing 30(7).

Pan, X.; Tan, J.; Kavulya. S.; G, R.; and Narasimhan, P. 2008. Ganesha: Black-box fault diagnosis for mapreduce systems. Technical report.

Reiter, R. 1987. A theory of diagnosis from first principles. Artificial intelligence 32(1):57-95.

Vavilapalli, V. K; Murthy, A. C.; Douglas, C.; Agarwal, S.; Konar, M.; Evans, R; Graves, T.; Lowe, J.; Shah, H.; Seth, S.: Saha, B.; Curino, C.; O'Malley, O.; Radia, S.; Reed, B.; and Baldeschwieler, E. 2013. Apache hadoop yarn: Yet another resource negotiator. In Proceedings of the 4th Annual Symposium on Cloud Complffing, SOCC' 13, 5:1-5:16. New York, NY, USA: ACM.

Zaharia, M.; Konwinski, A; Joseph, A D.; Katz, R.; and Stoica, I. 2008. Improving mapreduce performance in heterogeneous environments. In Proceedings of the 8th USENIX conference on Operating systems design and implementation, OSDI'08, 29-42. Berkeley, CA, USA: USENIX Association.

Zhang, R.; Moyle, S.; McKeever, S.; and Bivens, A. 2007. Performance problem localization in self-healing, service-oriented systems using bayesian networks. In Proceedings of the 2007ACM symposium on Applied computing, SAC '07, ACM.

Zhuravlev, S.; Blagodurov, S.; and Fedorova, A. 2010. Addressing shared resource contention in multicore processors via scheduling. In Proceedings of the Fifteenth Edition of ASPLOS on Architectural Support for Programming Languages and Operating Systems, ASPLOS XV, 129-142. New York, NY, USA: ACM.

* cited by examiner

US 9,934,071 B2

JOB SCHEDULER FOR DISTRIBUTED SYSTEMS USING PERVASIVE STATE ESTIMATION WITH MODELING OF CAPABILITIES OF COMPUTE NODES

BACKGROUND

The present application relates generally to improving the throughput of a multi-server processing system. It finds particular application in conjunction with task scheduling in distributed compute systems using a map-reduce framework, and will be described with particular reference thereto. However, it is to be appreciated that the present application is also amenable to other like applications.

Map-reduce frameworks are a key technology for implementing big data applications. In these frameworks, a computational job is broken down into map and reduce tasks. The tasks are then allocated to a set of nodes (e.g., servers) so the tasks can be done in parallel. A map task processes a data block and generates a result for this block. A reduce task takes all these intermediate mapping results and combines them into the final result of the job.

A popular map-reduce framework is HADOOP® (registered TM of Apache Software Foundation). HADOOP® comprises a storage solution known as HADOOP® Distributed File System (HDFS), which is an open source implementation of the Google File System (GFS). HDFS is able to store large files across several machines, and using MapReduce, such files can be processed in a distributed fashion, moving the computation to the data, rather than the data to the computation. An increasing number of so called "big data" applications, including social network analysis, genome sequencing, and fraud detection in financial transaction data, require horizontally scalable solutions, and have demonstrated the limits of relational databases.

A HADOOP® cluster includes a NameNode (e.g. a node that keeps the directory tree of all files in the file system, and tracks where across the cluster the file data is kept but does not store the data itself) and many DataNodes (e.g., a node that stores data). When a file is copied into the cluster, it is divided into blocks, for example, of 64 megabytes (MBs). Each block is stored on three or more DataNodes depending on the replication policy of the cluster, as shown in FIG. 1. Once the data is loaded, computational jobs can be executed over it. New jobs are submitted to the NameNode, where map and reduce tasks are scheduled onto the DataNodes, as shown in FIG. 2.

This is illustrated at a high level in FIG. 3. With reference thereto, NameNode 310 splits a job 330 into tasks 340. The tasks 340 are then assigned to individual DataNodes 320. There may be a multitude of DataNodes 320, and, in one embodiment, the multitude of DataNodes is in the range of a 10-1000 s of DataNodes.

INCORPORATION BY REFERENCE

U.S. Patent Application Publication No. 2014/0289733 A1 (System and Method for Efficient Task Scheduling in Heterogeneous, Distributed Compute Infrastructures Via Pervasive Diagnosis) is hereby incorporated by reference in its entirety. U.S. patent application Ser. No. 14/797,547 (Dynamically Adaptive, Resource Aware System and Method for Scheduling) is hereby incorporated by reference in its entirety.

BRIEF DESCRIPTION

In accordance with one aspect of the present application, a system for scheduling jobs includes: a plurality of interconnected compute nodes defining a cluster of compute nodes, the cluster including a NameNode and a multitude of DataNodes; the NameNode including at least one processor. The at least one processor may be programmed to: schedule execution of a plurality of tasks on compute nodes of the cluster; receive state information variables of the compute nodes; determine if the state variables indicate that a current model of the capabilities of the compute nodes are no longer correct; if the state variables show that the current model is no longer correct, schedule a specific plurality of tasks onto the compute nodes for which a model discrepancy has been detected in order to obtain specific observations that allow for efficiently updating the model of that compute node.

In accordance with another aspect, a server includes: a memory with executable instructions stored thereon; and a processor configured to access said memory to execute said instructions. The processor may be configured to: schedule execution of a plurality of tasks on compute nodes of a cluster of compute nodes; receive state information variables of the compute nodes; determine if the state variables indicate that a current model of the capabilities of the compute nodes are no longer correct; if the state variables show that the current model is no longer correct, schedule a specific plurality of tasks onto the compute nodes for which a model discrepancy has been detected in order to obtain specific observations that allow for efficiently updating the model of that compute node.

In accordance with yet another aspect, a method for scheduling jobs in a cluster of compute nodes including a NameNode and a multitude of DataNodes, said method performed by one or more processors, said method including: schedule execution of a plurality of tasks on compute nodes of the cluster; receive state information variables of the compute nodes; determine if the state variables indicate that a current model of the capabilities of the compute nodes are no longer correct; if the state variables show that the current model is no longer correct, schedule a specific plurality of tasks onto the compute nodes for which a model discrepancy has been detected in order to obtain specific observations that allow for efficiently updating the model of that compute node.

DETAILED DESCRIPTION

Figure 1:
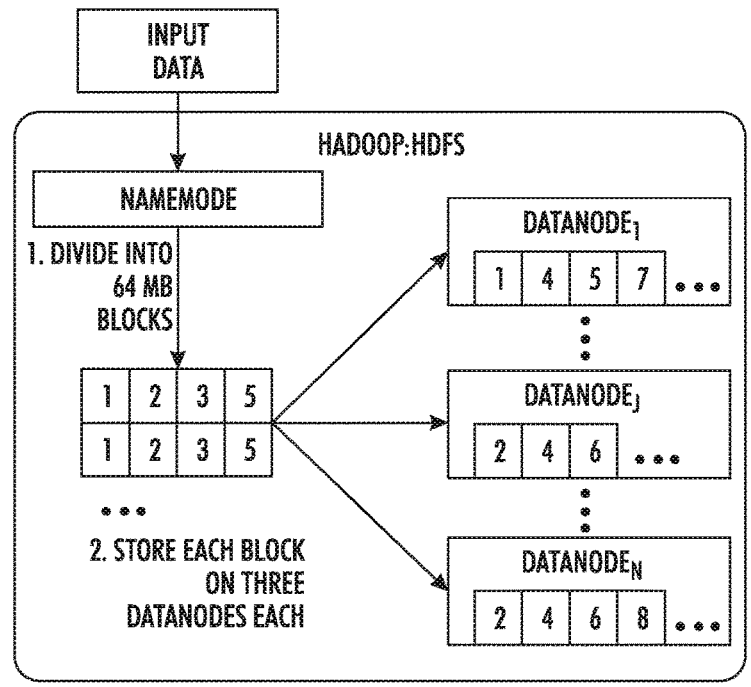
FIG. 1 illustrates the HADOOP® Distributed File System (HDFS).

Distributed systems, such as Hadoop, are designed to be used in high production environments. These systems have schedulers to execute workloads to achieve the expected production goals. To generate the most productive policies, schedulers must know the current state of the systems. The system state might change over time due to external factors or unknown processes. Updating beliefs about the system state is a challenging task as it has a direct impact on the productivity of the cluster. Once the system is running, stopping the production to estimate the server capabilities can severely reduce the efficiency. In such cases, the Pervasive Diagnosis (i.e., described in, Kuhn, L.; Price, B.; Do, M.; Liu, J.; Zhou, R.; Schmidt, T.; and de Kleer, J. 2010. Pervasive diagnosis. Systems, Man and Cybernetics, Part A: Systems and Humans, IEEE Trans-actions on 40(5):932-944.) approach may be applied, which intelligently executes production workload to update the beliefs. Even though Pervasive Diagnosis is a productive approach to estimate system states, it has the following limitations that make it unsuitable for Hadoop systems. 1. Pervasive Diagnosis is developed for binary systems and Hadoop is a continuous system. 2. Pervasive Diagnosis chooses the most informative policies to estimate state and does not guarantee high productivity of the policy. Therefore, in the approaches disclosed herein, a framework is designed that extends the Pervasive Diagnosis paradigm to continuous systems. A decision theoretic approach is also proposed to search a policy that estimates the system beliefs and maximizes the expected production. It is empirically demonstrated whether there is any uncertainty in the belief state or not, the proposed framework always gives a high production.

1 INTRODUCTION

A Cluster Management System (CMS) is an essential part of Distributed Systems, designed to distribute workload on clusters, to ensure resource availability, load balancing and to monitor workload execution. The devices and methods described herein use Hadoop as their Distributed System. Hadoop is a popular and extremely successful Map-Reduce based framework for horizontally scalable distributed processing of large data sets. The Hadoop CMS is described in the sections that follow. To achieve the best possible production from a cluster, the available resources need to be exploited efficiently. The decision on how to use the available resources, e.g., which tasks to execute on which server, is made by the task assignment unit of CMS, called the scheduler. This scheduler uses the current beliefs about the state of servers for an optimal task assignment. Therefore, the CMS must estimate the state of a cluster as precisely as possible to run the scheduler efficiently. In the present context, the state of a cluster is measured by the resource specific performance of every server in the cluster. In practice, there are several factors that might hamper a precise estimation of the performance of a server. For example, in a cluster consisting of several servers, a server might either be a physical machine or a Virtual Machine (VM) running on an unknown physical machine. Limping hardware, unspecified background processes, or poor task scheduling results in overloaded servers (Bortnikov, E.; Frank, A.; Hillel, E.; and Rao, S. 2012. Predicting execution bottlenecks in map-reduce clusters. In Proceedings of the 4th USENIX conference on Hot Topics in Cloud Ccomputing, HotCloud'12, 18-18. Berkeley, Calif., USA: USENIX Association). These problems create resource congestions such as CPU or I/O or network congestion, resulting in the lower performance of one or more resources. In case of VMs, this problem magnifies further because, while they are virtually isolated, they are dependent on a physical machine shared with other competing applications that may degrade their performance. Moreover, VM migrations may also result in unexpected and abrupt performance changes. Due to this volatile performance of servers, it is very challenging to precisely update the state of every sever.

Along with the precise estimation task, it is also essential for a CMS to be completely autonomous in order to make clusters self-adaptive. An efficient self-adaptive CMS automatically detects the changes in states, updates them and notifies these changes to the scheduler. As a consequence, the scheduler automatically adapts to these changes. As soon as changes in a server performance are detected, a common response is that the CMS stops production workloads and starts a software agent that runs a diagnostic workload on the server. Even though this approach estimates new states very precisely, it comes at a price: distributed systems are generally high-speed mass production systems, and therefore stopping servers can have serious negative impact on the overall cluster production. Therefore, there is a need for a framework that updates the beliefs about the server state with minimal production loss. To this end, the systems and methods described herein apply the Pervasive Diagnosis framework. The approaches described herein achieve this goal. Because this minimizes production loss, the technical functioning of the system is improved.

Pervasive Diagnosis (see Kuhn et al., supra) is a framework that identifies faulty components during the production without necessarily stopping the production. It enables higher production by scheduling production workload in systems to gain maximum diagnostic information. In Pervasive Diagnosis, if the scheduler is uncertain whether or not a component is faulty, it generates a production plan that uses such a suspicious component. Depending on the outcome of an execution plan (pass/fail), the state of the components is inferred. Pervasive Diagnosis has obtained a higher long-run productivity than a decoupled combination of production and diagnosis. Unfortunately, this framework has been only studied and developed for binary systems, where a component can be either faulty or healthy and plans can either pass or fail.

One aspect of the systems and methods described herein is to extend the Pervasive Diagnosis framework to the continuous domains to estimate the state of servers without stopping them from production. States of a server are modeled as continuous variables because severer states represent the effective capabilities of the servers. Therefore, the systems and methods described herein model server states as random variables. Unlike Pervasive Diagnosis, a server (component) may have more than one state variable. Every server has a state variable corresponding to every resource in the server. The systems and methods described herein consider CPU speed and IO bandwidth as state variables per server. If a certain workload is scheduled on a machine and a slow performance is observed, then it cannot precisely be said which resource is actually causing the slowdown. Therefore, the problem of estimating state is much more challenging than binary Pervasive Diagnosis.

To estimate the state of a system, Perverse Diagnosis runs diagnostic policy on the system that has maximum information. However, it might happen that the most informative policy might not be very productive. Systems such as Hadoop are developed for large volume production. Therefore, in the systems and methods described herein, to estimate the states, a policy is run that has maximum expected production and also maximizes future production gain. To select such a policy in decision theoretic settings, a cost function is presented in terms of instant expected production gain from running the policy and expected future production after running the policy. Such production decision theoretical framework is useful for systems such as Hadoop because, if the system is in the stable state where the system dynamics are not changing, then the framework would always run the most productive policy. On the other hand, in the case where there is uncertainty about the system state, the framework runs policies that will give enough information about the system to maximize the future production. Another aspect of the systems and methods described herein is to introduce such kind of decision theoretical support to the Pervasive Diagnosis framework to make it more efficient. The performance of the framework of the systems and methods described herein under stable condition and uncertain condition is empirically evaluated. In both the cases, the framework of the systems and methods described herein enables maximum production from the cluster. Under the stable condition, throughput improvement up to 18% is observed. Under uncertain conditions, throughput is gained by seven times compared to a scheduler that does not update the beliefs. This further demonstrates the improved technical functioning of the approaches described herein.

2 HADOOP BACKGROUND

The following will provide a brief review of Hadoop version 2 (see Vavilapalli, V. K.; Murthy, A. C.; Douglas, C.; Agarwal, S.; Konar, M.; Evans, R.; Graves, T.; Lowe, J.; Shah, H.; Seth, S.; Saha, B.; Curino, C.; O'Malley, O.; Radia, S.; Reed, B.; and Baldeschwieler, E. 2013. Apache hadoop yarn: Yet another resource negotiator. In *Proceedings of the 4th Annual Symposium on Cloud Computing*, SOCC '13, 5:1-5:16. New York, N.Y., USA: ACM.) and its schedulers. Scheduling in Hadoop 2 is done by the ResourceManager which runs on a single master server which is independent of cluster servers. ResourceManager can be interpreted as the CMS of Hadoop. For every incoming workload, the ResourceManager starts an ApplicationMaster on one of the cluster servers. The ApplicationMaster makes resource requests to the ResourceManager and is also responsible for monitoring the status of the workload. Workloads are divided into tasks and scheduler assigns tasks on servers in the cluster. Scheduler decides the total number of parallel tasks that can be executed on every server. Hadoop scheduler does not take the actual resource requirements of workloads into account. Instead, it assumes the same requirements for each task (typically, 1 CPU core, and 1 GB of memory). To determine the number of parallel tasks on a server, scheduler takes only CPU cores and the amount RAM on server into account. On the other hand, the framework of the systems and methods described herein relax this constraint and determine the number of parallel tasks on a server based on the resource requirements of tasks and the belief about of resource capabilities (state). Hadoop can only monitor the binary states server; it can identify if a server is dead or alive. Hadoop has no mechanism to determine resource specific state of servers.

3 DEFINITIONS

It is desirable to formally optimize the scheduling of jobs on a compute cluster given uncertain information about the cluster. The optimization will be based on a formal model which characterizes the jobs to be completed, the capabilities of compute nodes which will perform the work and the policy which allocates the jobs to nodes in the cluster. The following defines the components of this model.

3.0.1 Input Job Description

The set of jobs to be executed by the system is represented by the matrix $\Omega=\{\omega^1, \omega^2, \ldots, \omega^l\}$.

Each job is assumed to be composed of a large number of similar tasks. The resource requirements for every task are assumed to be similar and are given by the job profile tuple: $\omega^j = \langle \omega_1^j, \omega_2^j, \ldots, \omega_m^j \rangle$, where $\omega_r^j$ denotes the amount of resource r required by a task from job $\omega^j$.

In the specific case of a Hadoop cluster, jobs would correspond to various map-reduce problems. The Hadoop scheduler divides each job into many similar map and reduce tasks which are then executed by servers in parallel. A focus of the systems and methods described herein is to only consider the map tasks in a Hadoop job.

The requirements for a Hadoop job are approximated by a two-dimensional resource space $\omega^j = \langle \omega_c^j, \omega_d^j \rangle$ where $\omega_c^j$ gives the total CPU load in instructions required for the job and $\omega_d^j$ gives the number of bytes of disk I/O required for the job.

3.0.2 Server Node Capabilities

The capabilities of server nodes in our cluster have two components: a base capability component that is fixed over time, and a second, dynamic component that changes due job loads, software changes, job migration, etc.

The fixed CPU capabilities of the server are represented, by the tuple $A=\{\alpha^1, \alpha^2, \ldots, \alpha^n\}$ where $\alpha^k$ represents the CPU capabilities of server k. The CPU capability is defined as time per instruction (unit instruction time).

The second component represents the variable capabilities of the server and is characterized by the tuple: $\theta^t=\{\theta^1, \theta^2, \ldots, \theta^n\}$ where $\theta^k$ represents the variable capabilities of server k.

The variable capabilities of server k are, in turn, defined by a tuple $\theta^k = \langle \theta_c^k, \theta_d^k \rangle$ where $\theta_c^k$ describes the congestion scale factor for CPU and $\theta_d^k$ describes the disk bandwidth in terms of time per byte of I/O (unit I/O time).

Since the variable capabilities change over time and are uncertain, one approach is to treat them as random variables to be estimated. For a given interval during which the conditions remain fixed, it is assumed that the congestion scale factors are normally distributed.

Unlike the binary Pervasive Diagnosis framework where each component of the system is either working or failed, the framework described herein can assign continuous capabilities to each component (server) in the system (cluster).

3.0.3 Task Assignment Policy

The mapping of tasks to server nodes is controlled by a policy matrix $\Pi$ where $\pi_{i,j}$ denotes the number of tasks assigned to server node i from job j.

3.0.4 Observation

Given a specific assignment of tasks to server nodes $\Pi$, the framework described herein can execute the policy and then observe the system's behavior. Let O represent an observation of the system where $o_{i,j}$ is the time taken by server i to complete the tasks assigned to it from job j.

3.0.5 Performance Model

The performance model predicts the expected observed behavior O given a work load of jobs $\Omega$, fixed cluster CPU capabilities A, and variable cluster capabilities $\Theta^t$, as well as the scheduling policy $\Pi$. The general form of performance model is:

$$O = f(A, \Theta^t, \Omega, \Pi) \qquad (1)$$

The Hadoop cluster specific model has two components: one for computation and one for disk I/O. The computation term includes a base CPU time for task i on server j which is the total CPU load $\omega_c^i$ for the task, times the fixed CPU time per instruction $\alpha^j$ for the server j.

The CPU base time can be inflated by the congestion scale factor $\theta_c^i$ for CPU based on the current CPU load factor $L(\omega^i)$ which varies from zero when the work load is entirely disk to exactly one when the work load is entirely CPU.

The second component models the time taken by disk I/O. It is based on the disk load factor $L(a)$ and the variable capability for disk I/O on the server $\theta_d^j$ $$o_{i,j}^* = \omega_c^i \alpha^j + \omega_c^j L_c(\omega^i)^2 \theta_c^j + \omega_d^j L_d(\omega^i)^2 \theta_d^j$$

The load model $L_c(\omega^i)$ captures the proportion of the execution time that is due to one component of the model, thus accounting for whether that component is congested or not.

$$L_c(\omega^i) = \frac{\omega_c^i}{\omega_c^i + \omega_d^i} \quad (2)$$

3.1 Optimization

One goal is to develop a framework for schedulers that automatically generates policies that maximizes the production. A system can be in stable mode (where the system states remain steady) or the system can be in uncertain mode (where system states are varying). During the production, the cluster can anytime go from the stable mode to uncertain mode. A cost optimal scheduler will always keep the production maximum regardless of if the system is stable or uncertain. In decision theoretic settings, a scheduler generates policies to maximize a cost function. In the systems and methods described herein, the system production is the cost function. Assume, for the system state $\Theta^t$ and the policy $\Pi$, the scheduler uses a cost function $\mathcal{R}(\Pi, \theta^t)$. The scheduling policy can be formalized as:

$$\Pi^* = \frac{\text{argmax}}{\Pi} \mathcal{R}(\Pi, \Theta^t) \quad (3)$$

It should be noted that the cost function has both state and policy as input. If the cluster state is changing, the scheduler will automatically take these changes into account, and therefore, it will generate policies to maximize the cost (production).

Pervasive diagnosis addresses a particular problem. However, in uncertain mode, Pervasive Diagnosis uses information criteria to generate policies that give maximum information about the system.

However, there is no guarantee that the most informative policy is also the most productive policy. It might happen that the productivity goes down by executing the informative policy. Moreover, it cannot be said with certainty that after running the informative policy, the system will be productive enough to compensate the possible production lost by running the informative policy. In the present application, it is argued that for systems such as Hadoop, the productivity is the most critical metric. Lost production can seriously harm business revenue. Therefore, it is desired to develop a cost based decision theoretic framework that keeps the system production at the maximum possible level all the time. It is desired to achieve this goal of deriving a cost function $\mathcal{R}(\Pi, \theta^t)$ that can be used to generate policies that always maximize production. To define such cost function, a formulation to estimate the production of the cluster is also needed.

4 PRODUCTION METRIC AND STATE ESTIMATION

The following provides a formulation to estimate the expected value of production. Subsequently, the methodology to update the cluster state is provided. Expected value of production and state estimation are used to formulate $\mathcal{R}(\Pi, \theta^t)$.

4.1 Expected Production

The production can measure the expected performance of the system under certain policy and for given state of the system. When workloads are continuously submitted to the system, a system is productive if the workloads are finished at the maximum rate. A system will be finishing workloads at the maximum rate if it is efficiently using the available resources. In the present application, one definition of throughput is the expected production. Naively, though, the throughput could be defined as the amount of work done by the system per unit of time. In order to complete a workload, the system needs to do certain amount of work. The amount of work depends on the resource required by the workload. Time taken by a system to finish to a workload depends on the amount of work required by the workload. Therefore, workloads with required work will be completed at different rates. Hence every workload will have different throughput. Assume the system does $\lambda^i$ amount of work to complete $\omega^j$. If according to a policy $\Pi$, system is processing $x^j$ of workload $\omega^j$, then the system is doing $\lambda^j x$ amount of work for workload $\omega^j$. Throughput of the system is total throughput of all the workloads. Hence, $$U(\Theta^t, \Pi) = \sum_{j=1}^{m} \frac{x^j \lambda^j}{f(\Theta^t, \Pi, \omega^j)} \quad (4)$$

$f(\Theta^t, \Pi, \omega^j)$ is the completion time of workload $\omega^j$, given the system state $\Theta^t$ and $\Pi$, as described in Eq. (1). $U(\Theta^t, \Pi)$ is defined as production utility function. The expected production is given by:

$$E[U(\Theta^t, \Pi)] = \int_{\Theta^t} U(\Theta^t, \Pi) p(\Theta^t) d\Theta^t \quad (5)$$

4.2 State Estimation

Once the clusters start running tasks using a policy, their completion times are used as observations to update the state beliefs. In the present formulation, $\Theta^t$ is a set of state variables at time t, which are unobservable. $O^t$ is used to denote set of observations variables at time t. Bayesian filtering is used to to compute the posterior distribution of the most recent state, given all the previous observations. Therefore, the state estimation is given by:

$$P(\Theta^{t+1}|O^{1:t+1}) = P(O^{t+1}|\Theta^{t+1}) \int_{\Theta^t} P(\Theta^{t+1}|\Theta^t) P(\Theta^t|O^{1:t}) d\Theta^t \quad (6)$$

$P(O^{t+1}|\Theta^{t+1})$ can be directly derived from the performance model shown in Eq. (1). To obtain $P(\Theta^{t+1}|\Theta^t)$, the first order Markove assumption that the next state only depends on the previous state is used. Therefore, the following equation is used:

$$\Theta^{t+1} = \Theta^t + \dot{v} \quad (7)$$

$\dot{v}$ denotes the noise of the model. The noise models abrupt or gradual changes in the system. In case of abrupt changes $\dot{v}$, will have high value and therefore, the weight of older observations will be negligible compared to new observation in the state estimation shown in Eq. 7. The lower value of $\dot{v}$ implies the gradual changes, and, in that case, all observations will be treated equal. In Hadoop cases, $\dot{v}$ depends on VMs migration policy. VM migrations cause abrupt change in the server state hence, the higher probability of migration implies higher value of $\dot{v}$.

5 SEARCH OF COST OPTIMAL POLICY

After designing the methodologies to compute the expected production and system states from observations, the framework to search the most productive policy is now developed. A policy will be "most productive" it maximizes the expected production. Earlier, a definition was provided of the cost function $\mathcal{R}(\Pi, \Theta^t)$ that is used by scheduler in search the most productive policy (Eq. (8) below). If the system is in a stable state the $\mathcal{R}(\Theta^t, \Pi)$ is equal to $U(\Theta^t, \Pi)$ which is estimated in Eq. (4). Hence, the search of a productive policy can be given as:

$$\Pi^* = \frac{\operatorname{argmax}}{\Pi} E[U(\Theta^t, \Pi)] \qquad (8)$$

When system state is steady and its states are precisely known, scheduler finds a policy that maximizes expected production (e.g. that maximized throughput). However, when there is an uncertainty regarding the states of the system, then using the same belief to find optimal policy might harm the production (e.g. because it is likely that the actual state of the system might be different from the scheduler's beliefs about the system state). Hence, the system states need to be estimated precisely. It is desirable to use the Pervasive approach to estimate the system state. Unlike Pervasive Approach, the present framework should not use expected informative gain as the only expected cost. It should also incorporate expected production in the cost. The cost should also include expected future production after estimating the system state. Assume that the system is in state $\Theta^t$ and there is a high variance in system belief. The scheduler wants to search at policy that maximizes a cost function which is given as:

$$E[\mathcal{R}(\Theta^t,\Pi)]=E[\mathcal{R}^i(\Theta^t,\Pi)]+E[\mathcal{R}^f(\Theta^t,\Pi)] \qquad (9)$$

$E[\mathcal{R}^i(\Theta^t, \Pi)]$ is the immediate expected cost of executing a policy H on the system, which as be derived as:

$$E[\mathcal{R}^i(\Theta^t,\Pi)]=E[U(\Theta^t,\Pi)] \qquad (10)$$

Let $E[\mathcal{R}^f(\Theta^t, \Pi)]$ be the total expected reward in future for running new jobs after updating the model from observations. The future stream of value may be approximated by assuming the future returns stay constant until a regime change event (process migration, environment change, etc.). A discount factor $\gamma$ is used to represent the probability of this change occurring at any time step.

$$E[\mathcal{R}^f(\Theta^t, \Pi)] = \sum_{i=0}^{\infty} \gamma^i E\left[\max_{\Pi^*} U(\Theta^{t+1} | \Pi, \Pi^*)\right] = \frac{E\left[\max_{\Pi^*} U(\Theta^{t+1} | \Pi, \Pi^*)\right]}{1-\gamma} \qquad (11)$$

After running the policy $\Pi$, the expected maximum value of production is given by $E[\max_\Pi *U(\Theta^{t+1}|\Pi, \Pi^*)]$. After estimating the state $\Theta^{t+1}$, the policy that maximizes the expected production is, $\Pi^*$.

Hence, total expected reward can be given as:

$$E[\mathcal{R}(\Theta^t, \Pi)] = E[U(\Theta^t, \Pi)] + \frac{E\left[\max_{\Pi^*} U(\Theta^{t+1} | \Pi, \Pi^*)\right]}{1-\gamma}$$

Here, $E[U(\Theta^t, \Pi)]$ can be simply evaluated using Eq. (5). $E[\max_\Pi *U(\Theta^{t+1}|\Pi, \Pi^*)]$ cannot be determined easily. Since $\Theta^{t+1}$ cannot be determined before running policy $\Pi$ in state $\Theta^t$, the following uses computational intensive sampling multiple times to estimate $E[\max_\Pi *U(\Theta^{t+1}|\Pi, \Pi^*)]$. Also, for every sample, the policy $\Pi^*$ that maximizes the expected production is searched for. Implementing such a heavy sampler in scheduler can significantly reduce the overall performance of system.

The utility gained is therefore approximated by using an improved model in the future by a linear multiple $\beta$ of the information gain associated with the experimental policy $\Pi^*$.

$$E[\hat{U}(\Theta^{t+1}|\Pi)]=\beta \cdot IG(\Theta^{t+1},\Pi) \qquad (12)$$

Information theory tells us that the expected KL divergence (information gain) is simply the mutual information between the observation and the state of the cluster $I(\Theta^t; O|\Pi)$ (Cover, T. M., and Thomas, J. A. 1991. Elements of information theory. New York, N.Y., USA: Wiley-Interscience.).

$$I(\Theta^{t+1}; O | \Pi) = \int_O \int_{\Theta^{t+1}} p(\Theta^{t+1} | O, \Pi) \ln \frac{p(\Theta^{t+1} | O, \Pi)}{p(\Theta^t)} d\Theta^{t+1} p(O | \Pi) dO \qquad (13)$$

The complete objective function with one term for present value and a second term approximating future value by information gain is:

$$E[\hat{\mathcal{R}}(\Theta^t,\Pi)]=E_{\Theta^t}[U(\Theta^t,\Pi)]+\beta \cdot I(\Theta^{t+1};O|\Pi) \qquad (14)$$

This policy is suboptimal as it may learn more than is necessary to make effective decisions, but should optimize the schedule to learn about the most uncertain parameters.

6 EMPIRICAL RESULTS

To empirically demonstrate the performance of the framework described herein, experiments were conducted on a six node Hadoop cluster. The framework described here was tested and implemented in Hadoop scheduler and denoted ThroughputScheduler. Each node has 8 physical CPU cores, 12 GB of RAM, and runs CentOS 5.6. Also used were Hadoop benchmark examples as workloads. A primary goal was to maximize production (throughput) under stable and uncertain states. Therefore, experiments were run to demonstrate the effectiveness of the framework described herein in stable state and uncertain states.

6.1 Performance under Stable State

To evaluate the performance of ThroughputScheduler in stable state, various Hadoop workloads were run, and the cluster's throughput for each workload was measured. Since it is common to submit multiple workloads in parallel, workloads were also run in combinations and throughput for each combination was measured. The performance of ThroughputScheduler was compared against state of art (CapacityScheduler and FairScheduler).

Figure 4:
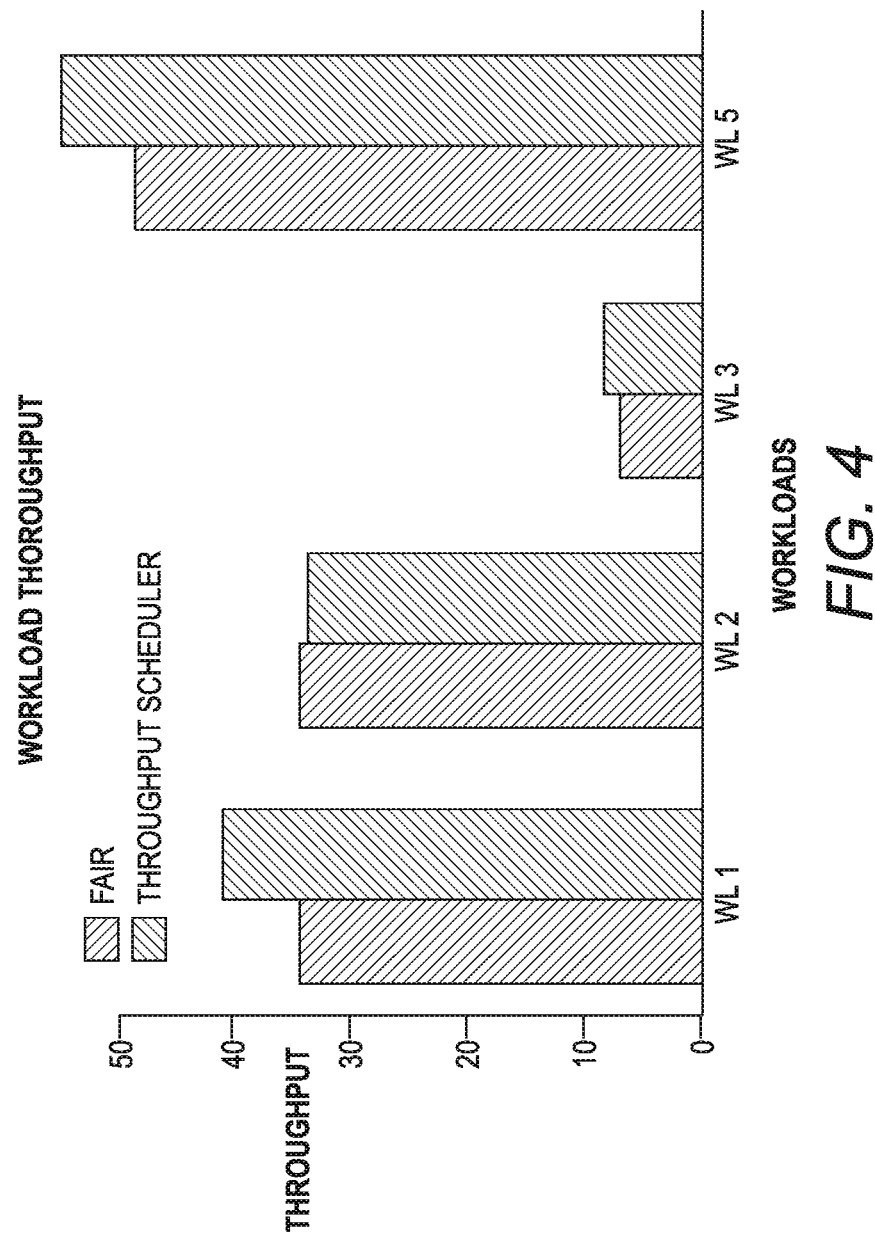
FIG. 4 shows a comparison of ThroughputScheduler with Capacity Scheduler in terms of throughput.

FIG. 4 shows a comparison of ThroughputScheduler with Capacity Scheduler in terms of throughput. Throughput improvement up to 18% was observed. The results show that ThroughputScheduler delivers higher throughput than Fair and Capacity schedulers by assigning tasks to servers that maximize the production.

6.2 Performance Under Uncertainty

To evaluate the performance of ThroughputScheduler under uncertainty, a few CPU cores of a server were shut down while running the workload. Shutting down cores during the workload execution also simulates the VM migration effect. This experiment was run using ThroughputScheduler, with and without the Pervasive framework. Without the Pervasive framework, ThroughputScheduler assumes no changes in the belief states. Therefore, it uses the initial beliefs about the states during the entire execution of workloads. On the other hand, with the framework, ThroughputScheduler estimates the new belief as soon as a change in detected and derives a policy that maximizes the throughput for new beliefs.

Figure 5:
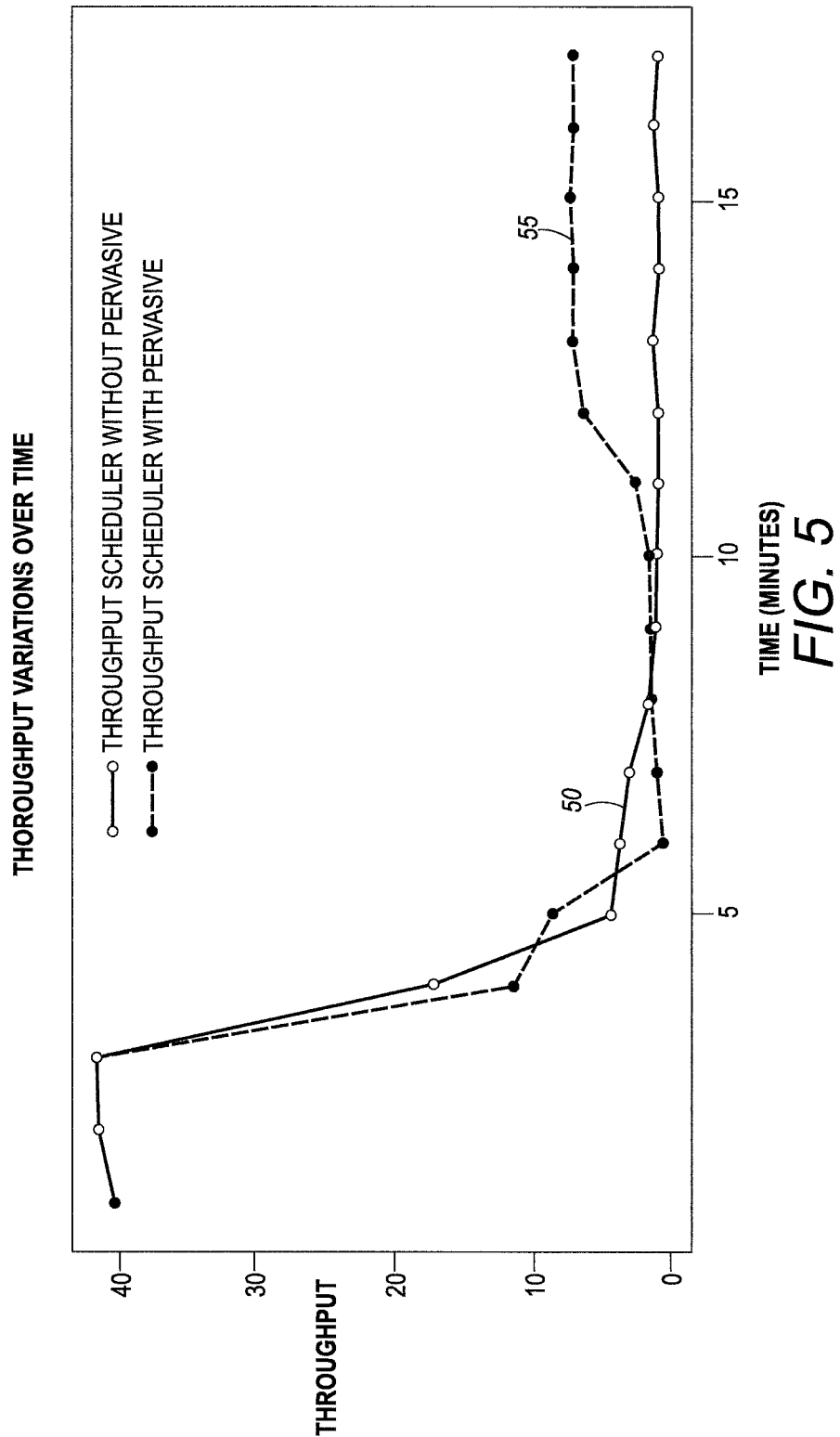
FIG. 5 shows Performance of ThroughputScheduler with and without Pervasive framework.

FIG. 5 shows Performance of ThroughputScheduler with and without Pervasive framework. $\beta=0$ is used for this experiment. FIG. 5 further shows that the throughput drops from 40 to around 1 due to core shutdown. Without the Pervasive state estimation framework, ThroughputScheduler keeps running under such a low throughput. On the other hand, with the Pervasive framework, the throughput goes down in beginning but the schedulers update the beliefs states, which results in throughput gains of almost 7 times gain. It must be noted that Hadoop clusters are long running systems and therefore 7 times gain in the throughput is very valuable. This is another example of the improved technical functioning of the approaches described herein. Line 50 shows ThroughputScheduler without Pervasive. Line 55 shows ThroughputScheduler with Pervasive.

Figure 6:
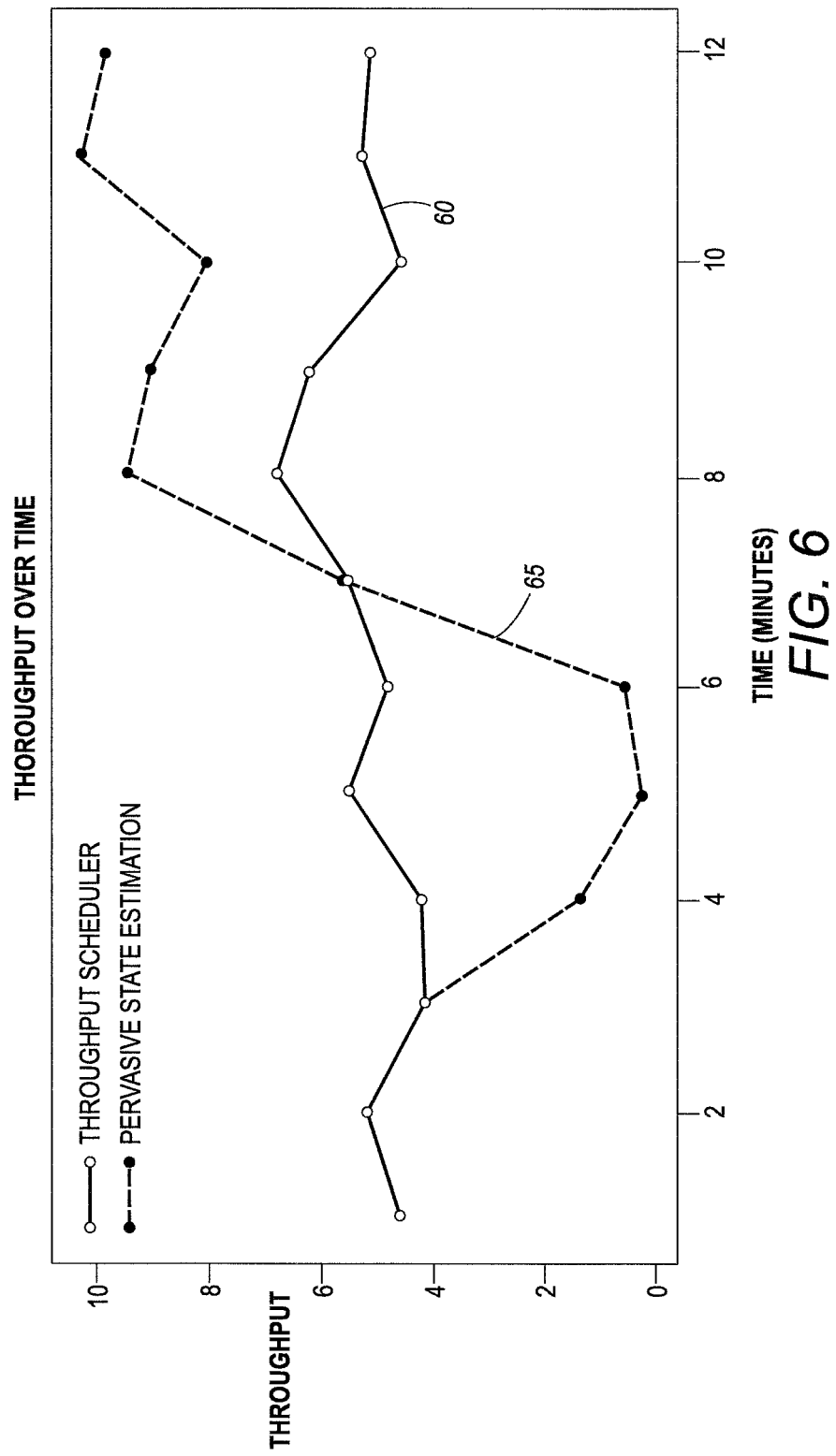
FIG. 6 shows Performance of ThroughputScheduler with and without Pervasive framework.

In the second experiment, no artificial slowdown is injected into any of the servers. While running the workloads on the cluster, the scheduler detects that one of the servers is producing lower throughput than other servers. This is a suspicious observation because it is believed that all the servers were identical. Less throughput indicates that the server state is different from other servers. The server might be performing slower to process this kind of workloads or it has some hardware issues or it might be running some unknown processes. To obtain more information about the server, ThroughputScheduler with Pervasive, runs the workloads according to an informative policy by setting $\beta=1$. Results of the experiment are shown in FIG. 6. Line 60 shows ThroughputScheduler. Line 65 shows Pervasive State Estimation.

FIG. 6 shows Performance of ThroughputScheduler with and without Pervasive framework. $\beta=1$ is used for this experiment.

Results show that with the Pervasive framework, throughput of the server goes down as it runs informative tasks to determine the updated beliefs. However, after the update the throughput increases and becomes better than ThroughputScheduler without Pervasive.

In both the experiments under uncertainty, the performance of the framework on only one server rather than the entire cluster is also demonstrated. We must recall that throughput of the cluster is a sum of throughputs of all the servers. Therefore, any improvement in one server's throughput directly improves the throughput of the cluster.

7 RELATED WORK

In the systems and methods described herein, the Pervasive Diagnosis approach (see Kuhn et al., supra) is extended to continuous variable systems. Pervasive diagnosis provides a framework that integrates learning with diagnosis. The framework is built on the principles of diagnosis (Reiter, R. 1987. A theory of diagnosis from first principles. Artificial Intelligence 32(1):57-95.) where observations are used to infer the system state. However, this framework is not an ideal choice for Distributed Systems such as Hadoop. Distributed systems can have problems like resource contentions (Hood, R.; Jin, H.; Mehrotra, P.; Chang, J.; Djomehri, J.; Gavali, S.; Jespersen, D.; Taylor, K.; and Biswas, R. 2010. Performance impact of resource contention in multi-core systems. In Parallel Distributed Processing (IPDPS), 2010 IEEE International Symposium on, 1-12.); (Zhuravlev, S.; Blagodurov, S.; and Fedorova, A. 2010. Addressing shared resource contention in multicore processors via scheduling. In Proceedings of the Fifteenth Edition of ASPLOS on Architectural Support for Programming Languages and Operating Systems, ASPLOS XV, 129-142. New York, N.Y., USA: ACM.); (Blagodurov, S.; Zhuravlev, S.; and Fedorova, A. 2010. Contention-aware scheduling on multi-core systems. ACM Trans. Comput. Syst. 28(4):8:1-8:45.), which cannot be interpreted as discrete variables. In Hadoop community, tools and methodologies (Massie, M. L.; Chun, B. N.; and Culler, D. E. 2004. The Ganglia Distributed Monitoring System: Design, Implementation, and Experience. Parallel Computing 30(7).); (Fonseca, R.; Porter, G.; Katz, R. H.; Shenker, S.; and Stoica, I. 2007. X-trace: A pervasive network tracing framework. In NSDI.); (Pan, X.; Tan, J.; Kavulya, S.; G, R.; and Narasimhan, P. 2008. Ganesha: Black-box fault diagnosis for mapreduce systems. Technical report.); (Konwniski, A., and Zahari, M. 2008. Finding the elephant in the data center: Tracing hadoop. Technical report.) have been developed to estimate the resource specific server states. However, these tools require human intervention to precisely estimate the states. Automated performance diagnosis in service based cloud infrastructures is also possible via the identification of components (software/hardware) that are involved in a specific query response (Zhang, R.; Moyle, S.; McKeever, S.; and Bivens, A. 2007. Performance problem localization in self-healing, service-oriented systems using bayesian networks. In Proceedings of the 2007 ACM symposium on Applied computing, SAC '07. ACM.). This approach cannot be used for Hadoop because Hadoop runs on commodity hardware and therefore can have heterogenous servers. The determination of a reasonable cut-off for heterogenous cluster is challenging. Additionally, there has been interest in developing Hadoop schedulers. The *LATE Scheduler* (Zaharia, M.; Konwinski, A.; Joseph, A. D.; Katz, R.; and Stoica, I. 2008. Improving mapreduce performance in heterogeneous environments. In Proceedings of the 8th USENIX conference on Operating systems design and implementation, OSDI'08, 29-42. Berkeley, Calif., USA: USENIX Association.) improves speculative executing for heterogeneous clusters, to only speculatively execute tasks that will indeed finish late using the concept of straggler tasks (Bortnikov et al., supra). The *Context Aware Scheduler for Hadoop* (CASH) (Kumar, K. A.; Konishetty, V. K.; Voruganti, K.; and Rao, G. V. P. 2012. Cash: context aware scheduler for hadoop. In Proceedings of the International Conference on Advances in Computing, Communications and Informatics, ICACCI '12, 52-61. New York, N.Y., USA: ACM.) assigns tasks to the nodes that are most capable to satisfy the tasks' resource requirements. CASH learns resource capabilities and resource requirements to enable efficient scheduling. However, unlike online learning of the present application, CASH learns capabilities and requirements in offline mode. (In the present application, no offline learning phase is required). An architecture of a resource-aware cloud-driver for heterogeneous Hadoop clusters was proposed to improve the performance and increase fairness (Lee, G.; Chun, B.-G.; and Katz, H. 2011. Heterogeneity-aware resource allocation and scheduling in the cloud. In Proceedings of the 3rd USENIX conference on Hot topics in cloud computing, HotCloud'11, 4-4. Berkeley, Calif., USA: USENIX Association.). However, none of these schedulers use a feedback loop to obtain information about the cluster which is used for real time scheduling.

8 CONCLUSIONS

As described herein, the Pervasive Diagnosis framework for estimating system belief is extended to continuous domains. To estimate the system belief, the described framework uses a decision theoretic approach to determine an optimal policy that maximizes immediate and future production, weighing the cost in production of diagnostic workloads against future gains. An objective function is derived to implement the decision theoretic scheme. Either there is uncertainty about the system beliefs or the beliefs are known precisely, and either way the framework will generate optimal policies that maximizes the production. Unlike Pervasive Diagnosis, the systems and methods described herein can handle systems that are described by multiple, continuous state variables. The systems and methods described herein implement pervasive state estimation for the problem of scheduling in Hadoop, to maximize the production of Hadoop clusters. One definition of throughput is as a metric to measure cluster production. For Hadoop clusters, the system CPU congestion and IO bandwidth of the servers are used as state variable. Empirically, the described Hadoop scheduler improves the cluster throughput by up to 18% under stable conditions. More importantly, it is also demonstrated that when server capabilities change our framework successfully detects the change, updates its belief by running informative workloads, and as a result can provide throughput that can be seven times higher compared to a scheduler that does not update its belief state.

9 ADDITIONAL EXPLANATIONS

Figure 7:
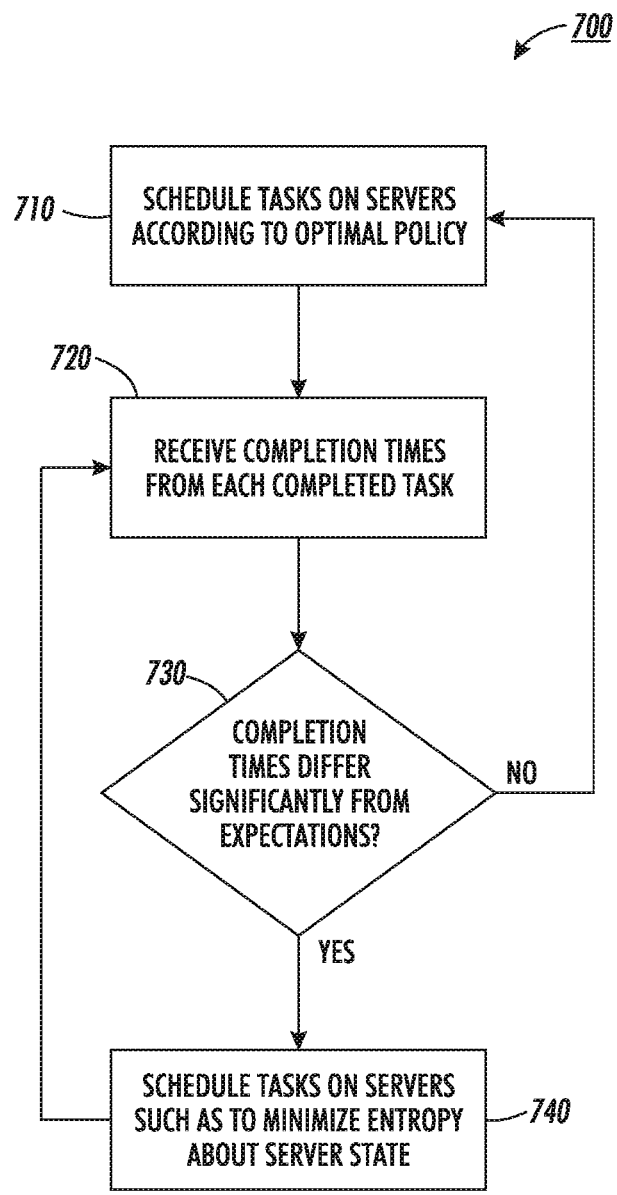
FIG. 7 shows an embodiment of a method described herein.

Flowchart 700 of FIG. 7 illustrates one embodiment. With reference thereto, in step 710, tasks are scheduled according to an optimal policy. In step 720, completion times are received from each completed task. In step 730, it is determined if completion times differ significantly form expectations. If so, the illustrated method proceeds to step 740 and tasks are scheduled on servers such as to minimize entropy (e.g. a disorder) about a server state; if not, the illustrated method returns to step 710.

Figure 8:
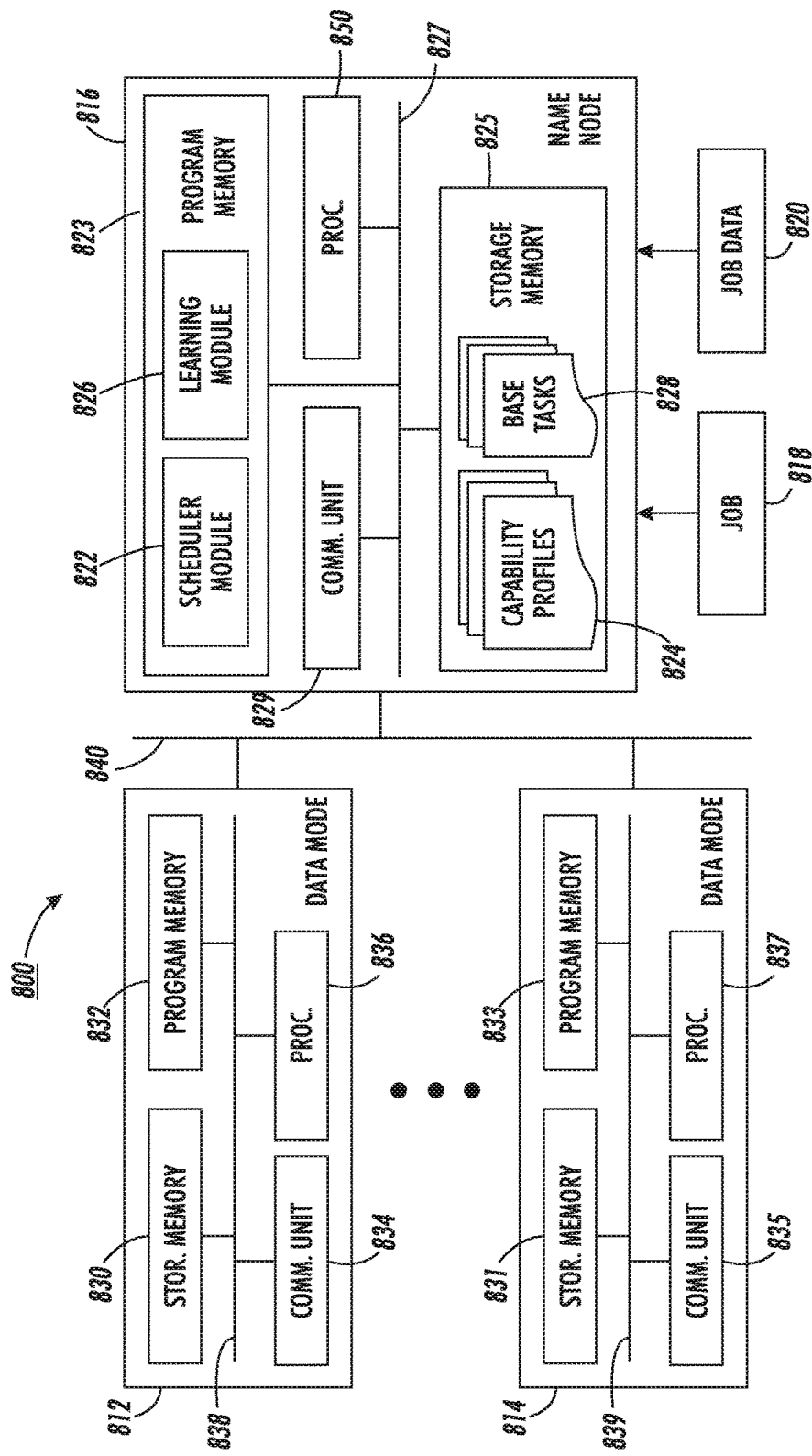
FIG. 8 illustrates a distributed compute system for executing data processing jobs.

Turning to FIG. 8, illustrated in accordance with the present concepts, a distributed compute system 800 for executing data processing jobs is provided. The system 800 includes a plurality of compute nodes 812, 814, 816 (e.g., servers) interconnected by a communication network 840. The compute nodes 812, 814, 816 define a map-reduce cluster and include a name node 816 and a plurality of data nodes 812, 814. Suitably, the compute nodes 812, 814, 816 are heterogeneous in that the compute nodes 812, 814, 816 include compute nodes with different capabilities (e.g., different disk I/O speed, CPU speed, memories etc.). Compute nodes 812, 814, 816 may include storage memory(s) 830, 831, 825 program memory(s) 832, 833, 823 communication unit(s) 834, 835, 829 one or more processors 836, 837, 850 and bus(es) 838, 839, 827.

The name node 816 is configured to receive a job 818 to be performed by the plurality of data nodes 812, 814 and job data 820 to be processed through performance of the job 818. The job 818 and job data 820 can be, for example, received remotely (e.g., over a communications network) or locally (e.g., from a program running on the name node 816). The job 818 is a program configured to work within the map-reduce framework of the system 800. In that regard, the program can, for example, include map and reduce functions performed by the map and reduce tasks, respectively. Typically, the map and reduce functions operate at the level of a record or a line of text. The map function of the well-known WordCount program, for example, counts occurrences of words in lines of text.

The name node 816 breaks the job data 820 into blocks (e.g., 64 megabytes (MBs)), or otherwise receives the job data 820 as blocks, and stores the blocks of the job data 820. In some embodiments, the job data 820 is stored in a distributed file system (e.g., a Hadoop Distributed File System (HDFS)) spanning the data nodes 812, 814. Further, in some embodiments, where the job data 820 is stored in a distributed file system, each block is stored on a predetermined number (e.g., three) of the data nodes 812, 814. See, for example, FIG. 1.

Figure 2:
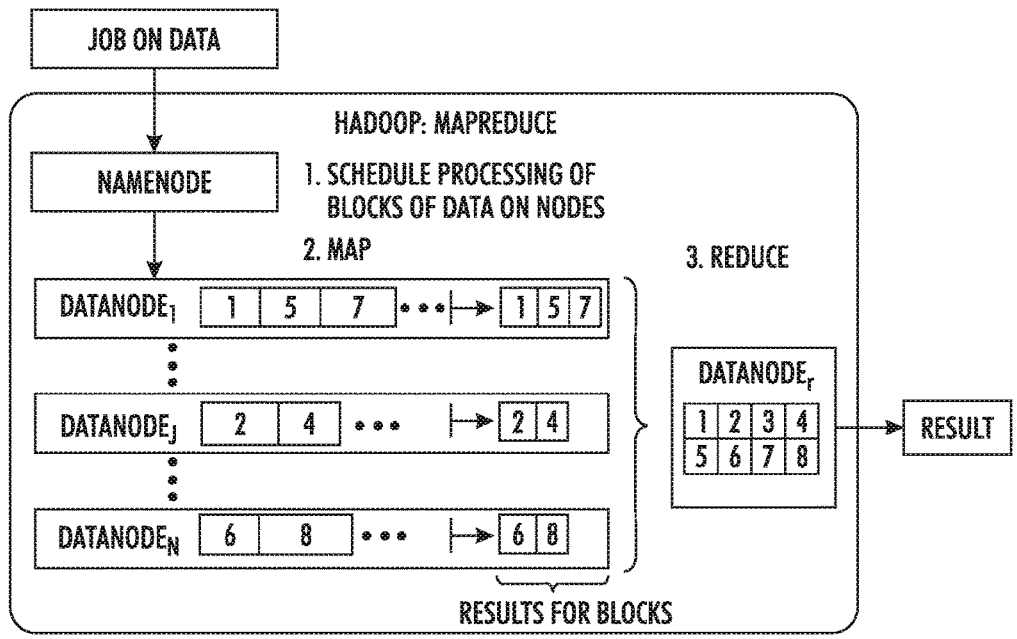
FIG. 2 illustrates an example implementation of a map-reduce framework known as HADOOP®.
Figure 3:
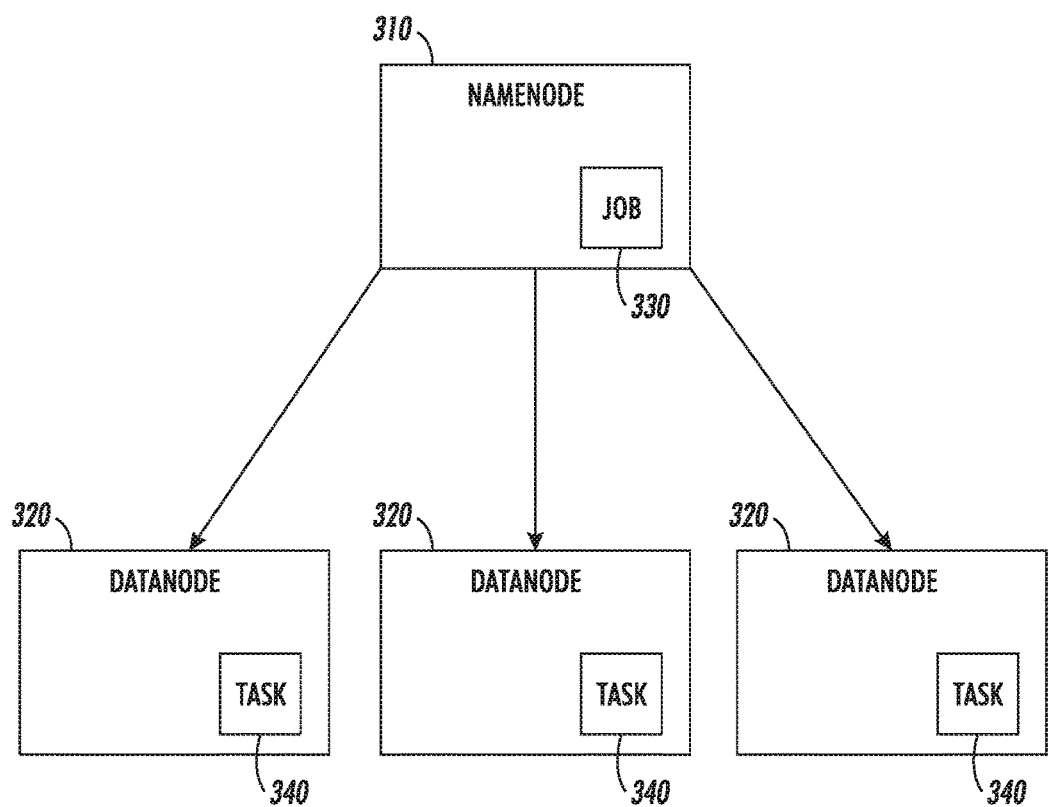
FIG. 3 illustrates an exemplary relationship between a NameNode and DataNodes.

The name node 816 further breaks the job 818 into a plurality of map and reduce tasks, or otherwise receives the job 818 broken into map and reduce tasks, and schedules execution of the tasks on the data nodes 812, 814. See, for example, FIG. 2. Each map task operates on a different block of the job data 820, where the map tasks of the job 818 collectively operate on all of the blocks of the job data 820. In some embodiments, where the job data 820 is stored in a distributed file system, each map task is assigned to one of the data nodes 812, 814 storing its respective block. In this way, blocks will not to be transferred amongst the data nodes 812, 814. A map task processes a data block and generates a result for this block. A reduce task takes all these intermediate mapping results and combines them into the final result of the job 818.

Among other components, name node 816 includes communication unit 829, one or more processors 850, a program memory 823, storage memory 825, and bus 827. To schedule the tasks of the job 818 onto the data nodes 812, 814, the name node 816 includes a scheduler module 822 within a program memory 823. The scheduler module 822 generates a schedule for executing the tasks which accounts for heterogeneity in the cluster and maximizes overall job throughput. This requires the scheduler module 822 to track available resources, which can be determined based on capability profiles 824 of the data nodes 812, 814 stored in storage memory 825. Namely, available resources can be determined by tracking those data nodes which are not being used and using the corresponding capability profiles.

The capability profiles 824 of the data nodes 812, 814 are determined as discussed above using a learning module 826 of program memory 823. The capability profile of a data node describes the capability of the data node. For example, the capability profile of a data node describes one or more of the CPU, memory, disk storage, software configuration, and the like of the data node.

The capability profiles 824 can be manually or automatically generated. Automatic generation is suitably performed using the learning module 826. Assumptions of availability of the following may possibly be made: 1) timing information from task executions for the data nodes 812, 814; 2) a set of base tasks 828 with various, known resource requirements (e.g., requirements pertaining to one or more of the CPU, memory, disk storage, software configuration, and the like); and 3) control over the scheduling of tasks onto the compute nodes 812, 814. Timing information for task executions includes the amount of time to complete each task execution (i.e., execution of task on a data node).

Advantageously, the systems and methods described herein improve the technical functioning of a cluster of compute nodes. For example, the systems and methods described herein more efficiently allocate tasks among compute nodes, allowing more efficient use of processors and memory on the compute nodes. This increases throughput, decreases overall job completion time, reduces the processing burden on certain processors, reduces the memory burden on certain memory storage devices, and so forth. As discussed above, the approaches disclosed herein further improve technical functioning because they: (i) minimize production loss; and (ii) improve throughput (e.g. by 18% as demonstrated by FIG. 4).

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. A system for scheduling jobs, said system comprising:
a plurality of interconnected compute nodes defining a cluster of compute nodes, the cluster including a NameNode and a multitude of DataNodes;
the NameNode including at least one processor programmed to:
schedule execution of a plurality of tasks on compute nodes of the cluster;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
wherein the NameNode has no offline learning phase prior to the scheduling execution of the plurality of tasks;
wherein the at least one processor is further programmed to:
if the plurality of interconnected compute nodes are in a steady state, schedule the execution of a plurality of tasks on compute nodes of the cluster using a policy that maximizes throughput; and
if the plurality of interconnected compute nodes are in an uncertain state, schedule the execution of a plurality of tasks on compute nodes of the cluster using a policy that gives information about the system to maximize future production.

2. The system of claim 1, wherein the scheduling of the specific plurality of tasks onto the compute nodes for which the model discrepancy has been detected is based on:

$$E[\hat{\mathcal{R}}(\Theta t, \Pi)] = E_{\Theta^t}[U(\Theta^t, \Pi)] + \beta \cdot I(\Theta^{t+1}; O|\Pi)$$

wherein:
E is an objective function;
$\hat{\mathcal{R}}(\ )$ is a cost function;
$\Theta^t$ represents the variable capabilities of the compute node state at time t;
$\Pi$ is a policy for job allocation;
$U(\ )$ is a production utility function;
$\beta$ is a linear multiple;
$I(\ )$ is a state of the cluster; and
$O|\Pi$ is an observation for a given workload.

3. The system of claim 1, wherein the at least one processor is further programmed to:
if the state variables show that the current model is correct, schedule tasks on the compute nodes so that throughput is maximized.

4. The system of claim 1, wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

5. The system of claim 1, wherein the scheduling of execution of the plurality of tasks on compute nodes of the cluster uses a model that has a computation component and a disk input/output (I/O) component.

6. A server, comprising:
a memory with executable instructions stored thereon; and
a processor configured to access said memory to execute said instructions and to:
schedule execution of a plurality of tasks on compute nodes of a cluster of compute nodes;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
wherein there is no offline learning phase prior to the scheduling execution of the plurality of tasks;
wherein the processor is further programmed to:
if the plurality of interconnected compute nodes are in a steady state, schedule the execution of a plurality of tasks on compute nodes of the cluster using a policy that maximizes throughput; and
if the plurality of interconnected compute nodes are in an uncertain state, schedule the execution of a plurality of tasks on compute nodes of the cluster using a policy that gives information about the system to maximize future production.

7. The server of claim 6, wherein the scheduling of the specific plurality of tasks onto the compute nodes for which the model discrepancy has been detected is based on:

$$E[\hat{\mathcal{R}}(\Theta^t, \Pi)] = E_{\Theta^t}[U(\Theta^t, \Pi)] + \beta \cdot I(\Theta^{t+1}, O|\Pi)$$

wherein:
E is an objective function;
$\hat{\mathcal{R}}(\ )$ is a cost function;
$\Theta^t$ is a represents the variable capabilities of the compute node state at time t;
Π is a policy for job allocation;
U( ) is a production utility function;
β is a linear multiple;
I( ) is a state of the cluster; and
O|Π is an observation for a given workload.

8. The server of claim 6, wherein the processor is further programmed to:
if the state variables show that the current model is correct, schedule tasks on the compute nodes so that throughput is maximized.

9. The server of claim 6, wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

10. The server of claim 6, wherein the scheduling of execution of the plurality of tasks on compute nodes of the cluster uses a model that has a computation component and a disk input/output (I/O) component.

11. A method for scheduling jobs in a cluster of compute nodes including a NameNode and a multitude of DataNodes, said method performed by one or more processors, said method comprising:
schedule execution of a plurality of tasks on compute nodes of the cluster;
receive state information variables of the compute nodes;
determine if the state variables indicate that a current model of the capabilities of the compute nodes are no longer correct; and
in response to the state variables showing that the current model is no longer correct, schedule a specific plurality of tasks onto the compute nodes for which a model discrepancy has been detected in order to obtain specific observations that allow for efficiently updating the model of that compute node;
wherein there is no offline learning phase prior to the scheduling execution of the plurality of tasks;
wherein the method further comprises:
in response to the plurality of interconnected compute nodes being in a steady state, schedule the execution of a plurality of tasks on compute nodes of the cluster using a policy that maximizes throughput; and
in response to the plurality of interconnected compute nodes being in an uncertain state, schedule the execution of a plurality of tasks on compute nodes of the cluster using a policy that gives information about the system to maximize future production.

12. The method of claim 11, wherein the scheduling of the specific plurality of tasks onto the compute nodes for which the model discrepancy has been detected is based on:

$$E[\hat{\mathcal{R}}(\Theta^t,\Pi)] = E_{\Theta^t}[U(\Theta^t,\Pi)] + \beta \cdot I(\Theta^{t+1}, O|\Pi)$$

wherein:
E is an objective function;
$\hat{\mathcal{R}}(\ )$ is a cost function;
$\Theta^t$ represents the variable capabilities of the compute node state at time t;
Π is a policy for job allocation;
U( ) is a production utility function;
β is a linear multiple;
I( ) is a state of the cluster; and
O|Π is an observation for a given workload.

13. The method of claim 11, wherein the method further comprises:
in response to the state variables showing that the current model is correct, schedule tasks on the compute nodes so that throughput is maximized.

14. The method of claim 11, wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

15. A system for scheduling jobs, said system comprising:
a plurality of interconnected compute nodes defining a cluster of compute nodes, the cluster including a NameNode and a multitude of DataNodes;
the NameNode including at least one processor programmed to:
schedule execution of a plurality of tasks on compute nodes of the cluster;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
wherein:
the NameNode has no offline learning phase prior to the scheduling execution of the plurality of tasks;
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

16. A system for scheduling jobs, said system comprising:
a plurality of interconnected compute nodes defining a cluster of compute nodes, the cluster including a NameNode and a multitude of DataNodes;
the NameNode including at least one processor programmed to:
schedule execution of a plurality of tasks on compute nodes of the cluster;
receive state information variables of the compute nodes;
determine if the state variables indicate that a current model of the capabilities of the compute nodes are no longer correct;
if the state variables show that the current model is no longer correct, schedule a specific plurality of tasks onto the compute nodes for which a model discrepancy has been detected in order to obtain specific observations that allow for efficiently updating the model of that compute node;
if the plurality of interconnected compute nodes are in a steady state, schedule the execution of a plurality of tasks on compute nodes of the cluster using a policy that maximizes throughput; and if the plurality of interconnected compute nodes are in an uncertain state, schedule the execution of a plurality of tasks on compute nodes of the cluster using a policy that gives information about the system to maximize future production;
wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

17. The system of claim 16, wherein the NameNode has no offline learning phase prior to the scheduling execution of the plurality of tasks.

18. A system for scheduling jobs, said system comprising:
a plurality of interconnected compute nodes defining a cluster of compute nodes, the cluster including a NameNode and a multitude of DataNodes;
the NameNode including at least one processor programmed to:
schedule execution of a plurality of tasks on compute nodes of the cluster;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
wherein:
each DataNode of the multitude of DataNodes has a base capability component that is fixed over time, and dynamic component that changes over time;
the base capability component and the dynamic component are used in the scheduling execution of the plurality of tasks on the compute nodes of the cluster; and
the scheduling of execution of the plurality of tasks on compute nodes of the cluster uses a model that has a computation component and a disk input/output (I/O) component.

19. The system of claim 18, wherein the at least one processor is further programmed to:
if the plurality of interconnected compute nodes are in a steady state, schedule the execution of a plurality of tasks on compute nodes of the cluster using a policy that maximizes throughput; and
if the plurality of interconnected compute nodes are in an uncertain state, schedule the execution of a plurality of tasks on compute nodes of the cluster using a policy that gives information about the system to maximize future production.

20. A server, comprising:
a memory with executable instructions stored thereon; and
a processor configured to access said memory to execute said instructions and to:
schedule execution of a plurality of tasks on compute nodes of a cluster of compute nodes;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
wherein:
there is no offline learning phase prior to the scheduling execution of the plurality of tasks;
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

21. A server, comprising:
a memory with executable instructions stored thereon; and
a processor configured to access said memory to execute said instructions and to:
schedule execution of a plurality of tasks on compute nodes of a cluster of compute nodes;
receive state information variables of the compute nodes;
determine if the state variables indicate that a current model of the capabilities of the compute nodes are no longer correct; and
if the state variables show that the current model is no longer correct, schedule a specific plurality of tasks onto the compute nodes for which a model discrepancy has been detected in order to obtain specific observations that allow for efficiently updating the model of that compute node;
if the plurality of interconnected compute nodes are in a steady state, schedule the execution of a plurality of tasks on compute nodes of the cluster using a policy that maximizes throughput; and
if the plurality of interconnected compute nodes are in an uncertain state, schedule the execution of a plurality of tasks on compute nodes of the cluster using a policy that gives information about the system to maximize future production;
wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

22. The server of claim 21, wherein there is no offline learning phase prior to the scheduling execution of the plurality of tasks.

23. A server, comprising:
a memory with executable instructions stored thereon; and
a processor configured to access said memory to execute said instructions and to:
schedule execution of a plurality of tasks on compute nodes of a cluster of compute nodes;
receive state information variables of the compute nodes;
determine if the state variables indicate that a current model of the capabilities of the compute nodes are no longer correct; and if the state variables show that the current model is no longer correct, schedule a specific plurality of tasks onto the compute nodes for which a model discrepancy has been detected in order to obtain specific observations that allow for efficiently updating the model of that compute node;

wherein:
each DataNode of the multitude of DataNodes has a base capability component that is fixed over time, and dynamic component that changes over time;
the base capability component and the dynamic component are used in the scheduling execution of the plurality of tasks on the compute nodes of the cluster; and
the scheduling of execution of the plurality of tasks on compute nodes of the cluster uses a model that has a computation component and a disk input/output (I/O) component.

24. The server of claim 23, wherein the processor is further programmed to:
if the plurality of interconnected compute nodes are in a steady state, schedule the execution of a plurality of tasks on compute nodes of the cluster using a policy that maximizes throughput; and
if the plurality of interconnected compute nodes are in an uncertain state, schedule the execution of a plurality of tasks on compute nodes of the cluster using a policy that gives information about the system to maximize future production.

25. A method for scheduling jobs in a cluster of compute nodes including a NameNode and a multitude of DataNodes, said method performed by one or more processors, said method comprising:
schedule execution of a plurality of tasks on compute nodes of the cluster;
receive state information variables of the compute nodes;
determine if the state variables indicate that a current model of the capabilities of the compute nodes are no longer correct; and
in response to the state variables showing that the current model is no longer correct, schedule a specific plurality of tasks onto the compute nodes for which a model discrepancy has been detected in order to obtain specific observations that allow for efficiently updating the model of that compute node;

wherein:
there is no offline learning phase prior to the scheduling execution of the plurality of tasks;
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

26. A method for scheduling jobs in a cluster of compute nodes including a NameNode and a multitude of DataNodes, said method performed by one or more processors, said method comprising:
schedule execution of a plurality of tasks on compute nodes of the cluster;
receive state information variables of the compute nodes;
determine if the state variables indicate that a current model of the capabilities of the compute nodes are no longer correct; and
in response to the state variables showing that the current model is no longer correct, schedule a specific plurality of tasks onto the compute nodes for which a model discrepancy has been detected in order to obtain specific observations that allow for efficiently updating the model of that compute node;
in response to the plurality of interconnected compute nodes being in a steady state, schedule the execution of a plurality of tasks on compute nodes of the cluster using a policy that maximizes throughput; and
in response to the plurality of interconnected compute nodes being in an uncertain state, schedule the execution of a plurality of tasks on compute nodes of the cluster using a policy that gives information about the system to maximize future production;

wherein:
each DataNode of the multitude of DataNodes has a base capability component that is fixed over time, and dynamic component that changes over time; and
the base capability component and the dynamic component are used in the scheduling execution of the plurality of tasks on the compute nodes of the cluster.

27. The method of claim 26, wherein there is no offline learning phase prior to the scheduling execution of the plurality of tasks.

28. A method for scheduling jobs in a cluster of compute nodes including a NameNode and a multitude of DataNodes, said method performed by one or more processors, said method comprising:
schedule execution of a plurality of tasks on compute nodes of the cluster;
receive state information variables of the compute nodes;
determine if the state variables indicate that a current model of the capabilities of the compute nodes are no longer correct; and
in response to the state variables showing that the current model is no longer correct, schedule a specific plurality of tasks onto the compute nodes for which a model discrepancy has been detected in order to obtain specific observations that allow for efficiently updating the model of that compute node;

wherein:
each DataNode of the multitude of DataNodes has a base capability component that is fixed over time, and dynamic component that changes over time;
the base capability component and the dynamic component are used in the scheduling execution of the plurality of tasks on the compute nodes of the cluster; and
the scheduling of execution of the plurality of tasks on compute nodes of the cluster uses a model that has a computation component and a disk input/output (I/O) component.

29. The method of claim 28, wherein the method further comprises:
in response to the plurality of interconnected compute nodes being in a steady state, schedule the execution of a plurality of tasks on compute nodes of the cluster using a policy that maximizes throughput; and
in response to the plurality of interconnected compute nodes being in an uncertain state, schedule the execution of a plurality of tasks on compute nodes of the cluster using a policy that gives information about the system to maximize future production.

* * * * *